(12) United States Patent
Kim et al.

(10) Patent No.: US 12,021,245 B2
(45) Date of Patent: Jun. 25, 2024

(54) FUEL CELL ELECTRODE CATALYST PROTECTIVE LAYER FORMING METHOD

(71) Applicant: Robert Bosch GmbH, Stuttgart (DE)

(72) Inventors: Soo Kim, Arlington, MA (US); Jonathan Mailoa, Cambridge, MA (US); Christina Johnston, Spanish Fort, AL (US); Charles Tuffile, Swansea, MA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/894,510

(22) Filed: Aug. 24, 2022

(65) Prior Publication Data

US 2024/0072265 A1 Feb. 29, 2024

(51) Int. Cl.
 *H01M 4/88* (2006.01)
(52) U.S. Cl.
 CPC ................... *H01M 4/8892* (2013.01)
(58) Field of Classification Search
 CPC .................................................. H01M 4/8892
 USPC ......................................................... 427/115
 See application file for complete search history.

(56) References Cited

U.S. PATENT DOCUMENTS

| | | | |
|---|---|---|---|
| 8,979,978 B2* | 3/2015 | Miller | B01D 53/22 95/55 |
| 9,680,158 B2 | 6/2017 | Huang et al. | |
| 10,038,200 B2 | 7/2018 | Kim et al. | |
| 10,050,278 B2 | 8/2018 | Yom et al. | |
| 10,696,554 B2* | 6/2020 | Bedworth | C01B 32/194 |
| 10,886,540 B2 | 1/2021 | Xie et al. | |
| 10,981,120 B2* | 4/2021 | Liu | B01D 67/0055 |
| 11,145,875 B2 | 10/2021 | Kim et al. | |
| 11,631,863 B2* | 4/2023 | Mailoa | H01M 4/8657 429/532 |

(Continued)

FOREIGN PATENT DOCUMENTS

| | | |
|---|---|---|
| JP | 2006344428 A | 12/2006 |
| KR | 20140050503 A | 4/2014 |

(Continued)

OTHER PUBLICATIONS

Gasteiger et al., "Activity benchmarks and requirements for Pt, Pt-alloy, and non-Pt oxygen reduction catalysts for PEMFCs", Nov. 5, 2004, New York, 27 pages.

(Continued)

*Primary Examiner* — Brian K Talbot
(74) *Attorney, Agent, or Firm* — Brooks Kushman P.C.

(57) ABSTRACT

A fuel cell electrode protective layer forming method is disclosed. The method includes forming primary defects in a carbon-based protective layer material via a formation step. The primary defects are configured to transport fuel cell products and/or reactants representing a transported portion of a total fuel cell products and/or reactants. The difference between the total fuel cell products and/or reactants and the transported portion is an untransported portion. The method further includes activating secondary defects in the carbon-based protective layer material via an activation step. The secondary defects are configured to transport a portion of the untransported portion of the total fuel cell reactants and/or products. The activation step is different than the formation step.

20 Claims, 4 Drawing Sheets

(56) References Cited

U.S. PATENT DOCUMENTS

| | | | |
|---|---|---|---|
| 2012/0021131 A1 | 1/2012 | Borsting et al. | |
| 2012/0149897 A1 | 6/2012 | Jeon et al. | |
| 2012/0288750 A1* | 11/2012 | Kung | B82Y 30/00 |
| | | | 977/734 |
| 2013/0022892 A1 | 1/2013 | Hasegawa et al. | |
| 2013/0252138 A1 | 9/2013 | Zhou et al. | |
| 2013/0344413 A1* | 12/2013 | Kim | H01M 4/923 |
| | | | 429/480 |
| 2014/0162167 A1* | 6/2014 | Hong | H01M 8/0243 |
| | | | 429/465 |
| 2014/0272664 A1* | 9/2014 | Lu | H01M 8/0234 |
| | | | 429/529 |
| 2015/0247258 A1* | 9/2015 | Diankov | H01M 4/925 |
| | | | 117/106 |
| 2015/0303487 A1 | 10/2015 | Kamai et al. | |
| 2016/0093891 A1 | 3/2016 | Rehman et al. | |
| 2016/0251765 A1 | 9/2016 | Botte | |
| 2017/0040082 A1* | 2/2017 | Swett | H01B 1/04 |
| 2017/0065939 A1* | 3/2017 | Kim | B01D 71/021 |
| 2017/0092960 A1 | 3/2017 | Serov et al. | |
| 2017/0170487 A1 | 6/2017 | Kie et al. | |
| 2017/0194656 A1 | 7/2017 | Sinsabaugh et al. | |
| 2017/0296982 A1 | 10/2017 | Swett et al. | |
| 2018/0062181 A1 | 3/2018 | Gath et al. | |
| 2018/0123140 A1 | 5/2018 | Dai | |
| 2018/0145328 A1 | 5/2018 | Mullins et al. | |
| 2018/0145341 A1* | 5/2018 | Sung | H01M 8/0258 |
| 2018/0244524 A1 | 8/2018 | Ozyilmaz et al. | |
| 2018/0311624 A1* | 11/2018 | Lozada | B01D 67/0072 |
| 2018/0337411 A1 | 11/2018 | Ozyilmaz et al. | |
| 2019/0123359 A1 | 4/2019 | Morin et al. | |
| 2019/0280307 A1 | 9/2019 | Ramaswamy et al. | |
| 2020/0127279 A1 | 4/2020 | Roberts et al. | |
| 2020/0127300 A1 | 4/2020 | Prinz et al. | |
| 2020/0147590 A1 | 5/2020 | Mai et al. | |
| 2020/0153004 A1 | 5/2020 | Oh et al. | |
| 2021/0057760 A1 | 2/2021 | Kim et al. | |
| 2021/0159528 A1* | 5/2021 | Kim | H01M 4/8825 |

FOREIGN PATENT DOCUMENTS

| | | |
|---|---|---|
| KR | 101675494 B1 | 11/2016 |
| KR | 20210120911 A | 10/2021 |
| WO | 2012114108 A1 | 8/2012 |
| WO | 2018231998 A1 | 12/2018 |
| WO | 2022108586 A1 | 5/2022 |

OTHER PUBLICATIONS

Schwammlein et al., "Anode Aging during PEMFC Start-Up and Shut-Down: H2-Air Fronts vs Voltage Cycles", Journal of The Electrochemical Society, Dec. 19, 2018, Germany, 11 pages.

Fampiou et al., "Binding of Pt Nanoclusters to Point Defects in Graphene: Adsorption, Morphology, and Electronic Structure", The Journal of Physical Chemistry, Feb. 26, 2012, Massachusetts, 13 pages.

Chen et al., "Comprehensive Enhancement of Nanostructured Lithium-Ion Batter Cathode Materials via Conformal Graphene Dispersion", Nano Letters, Feb. 27, 2017, Illinois, 8 pages.

Zaton et al., "Current understanding of chemical degradation mechanisms of perfluorosulfonic acid membranes and their mitigation strategies: a review", Royal Society of Chemistry, Mar. 13, 2017, France, 30 pages.

Groger et al., "Review—Electromobility: Batteries or Fuel Cells?", Journal of The Electrochemical Society, Oct. 9, 2015, Germany, 19 pages.

Wood et al., "First-Principles-Inspired Design Strategies for Graphene-Based Supercapacitor Electrodes" The Journal of Physical Chemistry, Dec. 13, 2013, California, 12 pages.

Niaei et al., "Hydrogenated defective graphene as an anode material for sodium and calcium ion batteries: A density functional theory study", Carbon, Apr. 18, 2018, Australia, 12 pages.

Dasgupta et al., "Atomic Layer Deposition of Platinum Catalysts on Nanowire Surfaces for Photoelectrochemical Water Reduction", Journal of the American Chemical Society, Aug. 20, 2013, California, 4 pages.

Chao et al., "Nanostructured Platinum Catalysts by Atomic-Layer Deposition for Solid-Oxide Fuel Cells", Advanced Energy Materials, May 15, 2012, California, 4 pages.

An et al., "Ultra-thin platinum catalytic electrodes fabricated by atomic layer deposition", Phys. Chem. Chem. Phys., Mar. 7, 2013, California, 6 pages.

Wu et al., "Core-shell graphene@amorphous carbon composites supported platinum catalysts for oxygen reduction reaction", Chinese Journal of Catalysis, Apr. 20, 2015, China, 6 pages.

Wu et al., "Transforming chitosan into N-doped graphitic carbon electrocatalysts," Chemical Communications, vol. 51, p. 1334, 2015, 4 pages.

Ying et al., "Nitrogen-doped hollow porous carbon polyhedrons embedded with highly dispersed Pt nanoparticles as a highly efficient and stable hydrogen evolution electrocatalyst," Nano Energy, vol. 40, p. 88, 2017, 7 pages.

Yan et al., "Low-temperature synthesis of graphitic carbon-coated silicon anode materials," Carbon Energy, vol. 1, p. 246, 2019, 7 pages.

Paraknowitsch et al., "Ionic liquids as precursors for nitrogen-doped graphitic carbon," Advanced Materials, vol. 22, p. 87, 2010, 6 pages.

Zhang et al., "Tuning the Electrocatalytic Performance of Ionic Liquid Modified Pt Catalysts for the Oxygen Reduction Reaction via Cationic Chain Engineering", ACS Catal. 2018, 8, 8244-8254, 11 pages.

Aritonang et al., "Synthesis of Platinum Nanoparticles from K2PtCl4 Solution Using Bacterial Cellulose Matrix", Research Article, vol. 2014, Article ID 285954, 7 pages.

Liu et al., "In situ one-step synthesis of metal-organic framework encapsulated naked Pt nanoparticles without additional reductants",. Mater. Chem. A, 2015, 3, 8028, 6 pages.

Afsahi et al., "Electrocatalyst synthesized from metal organic frameworks", Journal of Power Sources 239 (2013), 9 pages.

Adlim et al., "Synthesis of chitosan-stabilized platinum and palladium nanoparticles and their hydrogenation activity", Journal of Molecular Catalysis A: Chemical 212 (2004), 9 pages.

Karuppannan et al., "A highly durable carbon-nanofiber-supported Pt-C core-shell cathode catalyst for ultra-low Pt loading proton exchange membrane fuel cells: facile carbon encapsulation," Energy & Environmental Science, vol. 12, p. 2820, 2019, 10 pages.

Wang et al., "Will any crap we put into graphene increase its electrocatalytic effect?," ACS Nano, vol. 14, No. 1, p. 21, 2020, 5 pages.

Jaber-Ansari et al., "Suppressing Manganese Dissolution from Lithium Manganese Oxide Spinel Cathodes with Single-Layer Graphene", Adv. Energy Mater. 2015, 5, 1500646, DOI: 10.1002/aenm.201500646, 10 pages.

Shearer et al., "Accurate thickness measurement of graphene," Nanotechnology, vol. 27, Feb. 18, 2016, pp. 1-10, DOI: 10.1088/0957-4484/27/12/125704.

* cited by examiner

FUEL CELL ELECTRODE CATALYST PROTECTIVE LAYER FORMING METHOD

TECHNICAL FIELD

The present disclosure relates to a fuel cell electrode catalyst protective layer forming method that may include activating secondary defects in a carbon-based protective layer material supported on a catalyst material layer.

BACKGROUND

An electrochemical cell is a device capable of either generating electrical energy from chemical reactions (e.g., fuel cells) or using electrical energy to conduct chemical reactions (e.g., electrolyzers). Fuel cells have shown promise as an alternative power source for vehicles and other transportation applications. Fuel cells operate with a renewable energy carrier, such as hydrogen. Fuel cells also operate without toxic emissions or greenhouse gases. An individual fuel cell includes a membrane electrode assembly (MEA) and two flow field plates. An individual fuel cell typically delivers 0.5 to 1.0 V. Individual fuel cells can be stacked together to form a fuel cell stack having higher voltage and power.

Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode catalyst layers of the electrolyzer.

One of the current limitations of widespread adoption and use of this clean and sustainable technology is the relatively expensive cost of the fuel cell. A catalyst material (e.g., platinum catalyst) is included in both the anode and cathode catalyst layers of a fuel cell. The catalyst material is one of the most expensive components in the fuel cell.

SUMMARY

According to one embodiment, a fuel cell electrode protective layer forming method is disclosed. The method includes forming primary defects in a carbon-based protective layer material via a formation step. The primary defects are configured to transport fuel cell products and/or reactants representing a transported portion of a total fuel cell products and/or reactants. A difference between the total fuel cell products and/or reactants and the transported portion is an untransported portion. The method further includes activating secondary defects in the carbon-based protective layer material via an activation step. The secondary defects are configured to transport a portion of the untransported portion of the total fuel cell reactants and/or products. The activation step is different than the formation step.

According to another embodiment, a fuel cell electrode protective layer forming method is disclosed. The method includes forming primary defects in a carbon-based protective layer material via a formation step. The primary defects are configured to transport fuel cell products and/or reactants representing a transported portion of a total fuel cell products and/or reactants. A difference between the total fuel cell products and/or reactants and the transported portion is an untransported portion. The method further includes activating secondary defects in the carbon-based protective layer material via an activation step. The secondary defects are configured to transport a portion of the untransported portion of the total fuel cell reactants and/or products. The activation step is different than the formation step. The method further includes applying the carbon-based protective layer material to a catalyst material layer.

According to yet another embodiment, a fuel cell electrode protective layer forming method is disclosed. The method includes forming primary defects in a carbon-based protective layer material via a formation step. The primary defects are configured to transport fuel cell products and/or reactants representing a transported portion of a total fuel cell products and/or reactants. A difference between the total fuel cell products and/or reactants and the transported portion is an untransported portion. The method further includes activating secondary defects in the carbon-based protective layer material via an activation step implementing a coverage characteristic. The secondary defects are configured to transport a portion of the untransported portion of the total fuel cell reactants and/or products. The activation step is different than the formation step.

DETAILED DESCRIPTION

Figure 1:
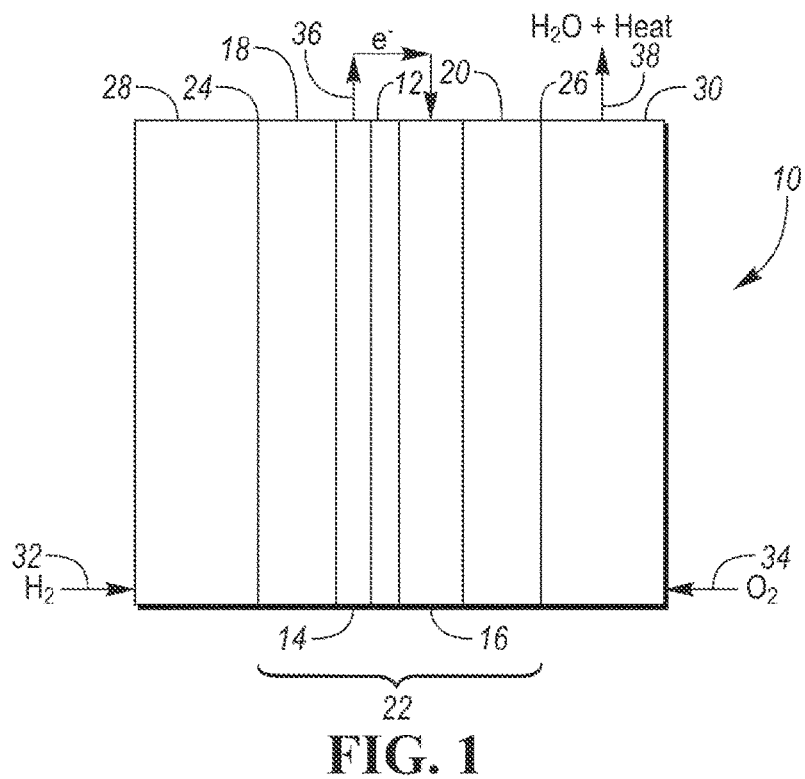
FIG. 1 depicts a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell. A fuel cell uses oxygen from air and compressed hydrogen as fuel sources, while only emitting water and heat. The widespread adoption of fuel cells would reduce carbon dioxide emissions. However, widespread adoption requires further technological development. One area for further technological development is improvement of the durability of the catalyst materials in the fuel cell.

Catalyst materials are included in a catalyst layer of an anode and a cathode of a fuel cell. Platinum catalysts are commonly used as the catalyst materials for the anode and/or cathode. Platinum catalysts are subject to dissolution and migration of Pt ions from the catalyst layer to other components in the fuel cell, such as the polymer electrolyte membrane (PEM). One catalyst degradation pathway in a fuel cell involves Pt dissolution at high operating potential (e.g., greater than about 0.6, 0.7, and 0.8 volts versus a standard hydrogen electrode (SHE)). In another catalyst degradation pathway, a fuel cell reaches an even greater potential than 0.8 volts (e.g., up to about 2 volts). This may occur due to non-steady operation, carbon corrosion and/or gas starvation during start-up and shutdown, where degradation of the catalyst and other fuel cell components may accelerate. When the electrochemically active surface area (ECSA) of a fuel cell catalyst is gradually reduced, a substantial decrease in oxygen reduction (ORR) activity may occur. Furthermore, dissolved catalyst metal ions may migrate toward other fuel cell components, for example, the polymer electrolyte membrane (PEM), potentially accelerating PEM degradations. What is needed is a method and structure to preserve the functioning of the catalyst material in fuel cells.

In one or more embodiments, a carbon-based material layer (e.g., a graphene-based material layer) introduced onto the catalyst material may have defects to promote preservation of Pt catalyst materials. The carbon-based material layer may be coated onto the catalyst material to form a carbon-based material coating layer. The defects may form a physical diffusion barrier for Pt ions, where Pt ions chemically bind and/or adsorb to the defect. Non-limiting examples of defects include mono-vacancy (MV), di-vacancy (DV), tri-vacancy (TV), quad-vacancy (QV), graphene holes, Stone-Wales (SW) defects, and/or commonly-found oxygen functional groups such as hydroxide (—OH), epoxy (—O—), carbonyl (=O), and/or carboxylic (—COOH) groups. These defects may help to suppress Pt and/or other metal ion dissolutions occurring at a high polymer electrolyte membrane fuel cell (PEMFC) potential (e.g., during high voltage operation, startup, shutdown, or after carbon corrosion) while permitting the transport of fuel cell reactants and products.

However, if a carbon-based layer is encapsulating a Pt catalyst material (e.g., at least partially surrounding the Pt catalyst material by 50, 60, 70, 80, 90, or 100%), it may present challenges for reactants (e.g., $H_2$ and $O_2$) and products (e.g., $H_2O$) to access the Pt catalyst material to perform an oxygen reduction reaction (ORR). In one or more embodiments, a method including an activation step is disclosed. The activation step may help form defects configured to facilitate the transport of reactants (e.g., $H_2$ and $O_2$) and products (e.g., $H_2O$).

FIG. 1 depicts a schematic, side view of fuel cell 10 according to one embodiment. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode 14 and cathode 16. The catalyst material is commonly the most expensive constituent of MEA 22.

Figure 2:
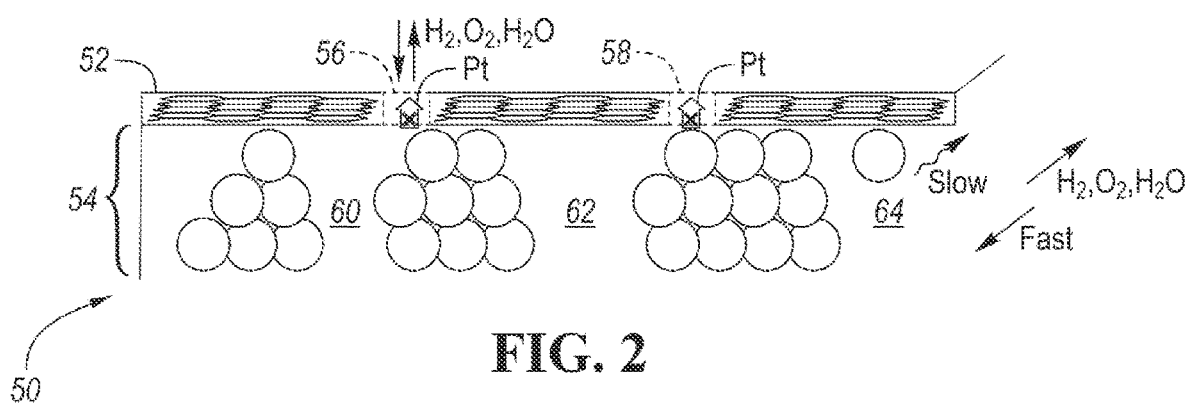
FIG. 2 depicts a schematic, partial side view of an electrode configured to be used as an anode or a cathode of a fuel cell.

FIG. 2 depicts a schematic, partial side view of electrode 50 configured to be used as anode 14 and/or cathode 16 of fuel cell 10. Electrode 50 includes first graphene-based material layer 52 and second graphene-based material layer (not shown) and catalyst material layer 54 extending therebetween. The graphene-based material layer may be a graphene sheet. First graphene-based material layer 52 includes defects 56 and 58. Defects 56 and 58 may be configured (1) to capture dissolved metal ions (e.g., $Pt^{2+}_{(aq.)}$ ions) from catalyst material layer 56, and/or (2) to provide a diffusion path (e.g., channel) for fuel cell reactants (e.g., $H_2$, $O_2$, and/or $H_2O$). The thickness (t) of catalyst material layer 54 may be any of the following values or in a range of any two of the following values: 1, 2, 3, 4, 5, 6, 7, 8, 9, 10 and 20 nm. Catalyst material layer 54 includes void spaces 60, 62, and 64 configured to reduce catalyst loading relative to a catalyst material layer not having void spaces while maintaining the same level of catalytic activity.

First and second graphene-based material layers are configured to preserve Pt ions when dissolved at high voltage. However, if the defects in the first and second graphene-based material layers become occupied by captured Pt ions, $H_2$, $O_2$, and/or $H_2O$ transport may slow through the defects or instead route around the defects and transport through the bulk of the graphene-based material layers (e.g., the graphene-based material layer regions not including the defects), which is suboptimal (e.g., an optimal bulk layer would not support any transport through the bulk). In one or more embodiments, transport channels may be added to the graphene-based material layers or other carbon-based material layers where the transport channels are configured to permit transport of $H_2$, $O_2$, and/or $H_2O$ through the transport channels instead of the bulk of the graphene-based material layers. In one or more embodiments, the transport channels may be added to the graphene-based material layers via electrical, electrochemical and/or chemical activation (e.g., via acid/base chemistry and/or a strong oxidizer). Electrochemical activation may activate the graphene-based material layer by the formation of defect transport channels.

As shown in FIG. 2, first graphene-based material layer 52 is a graphene-based material layer (and the second carbon-based material layer may also be graphene-based). The graphene-based materials may include defects 56 and 58. The concentration of these defects per unit area of the graphene-based material layer may be determined by synthesis conditions (e.g., heat treatment) and/or precursors (e.g., carbon precursors, quality of graphene coating, defect level of carbon, $sp^2$ vs. $sp^3$ distribution, etc.). A desired concentration of defects may exist depending on a lifetime requirement and/or an operating strategy of the fuel cell systems. For example, if the fuel cell is required to operate at a relatively high potential above 0.8 $V_{RHE}$, more defects may be desired to capture the dissolved metal ions from the catalyst layer during degradation. If fuel cell system can operate in a relatively low voltage (i.e., higher current density), then it is likely less Pt dissolution occurs and relatively less transport channels would support $H_2$, $O_2$, or $H_2O$ transport. Depending on interface formation between Pt and the carbon-based material layer (e.g., wrinkling and/or graphene defect populations), some types of activation cycles (e.g., by electrochemical route or by using acid treatment) may help to obtain a desired amount of defects. The activation process can lead to a relatively faster transport for $H_2$, $O_2$, and $H_2O$ to reach the desired ORR activity.

In one or more embodiments, increasing void space between the catalyst material layer and the carbon-based material layer may contribute to $H_2$, $O_2$, and $H_2O$ gas diffusion. In one or more embodiments, a portion of the catalyst material layer is not covered with a carbon-based material layer. While this may sacrifice some durability of catalyst materials (e.g., especially, at higher voltage regions), having an optimum concentration of uncovered portions may achieve desired ORR activity (e.g., easier access to catalytic surface area without intensive activation steps).

Figure 3:
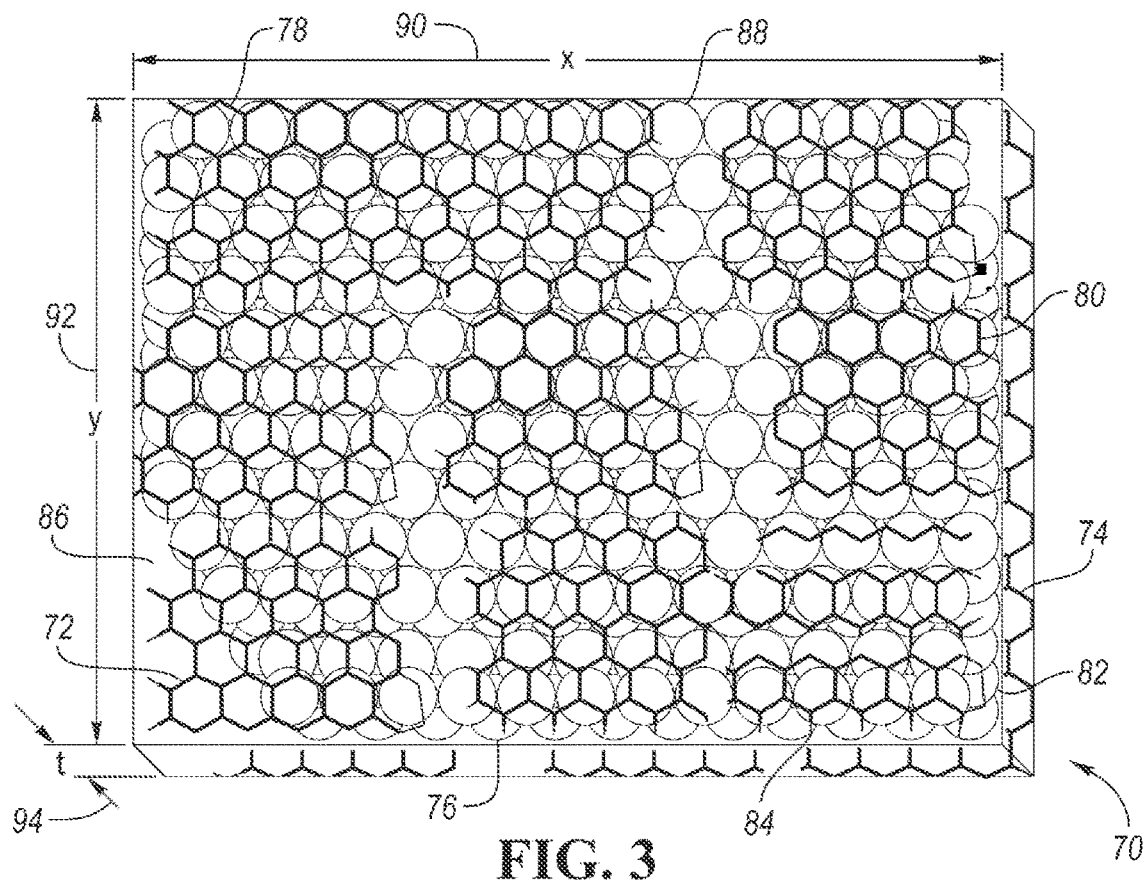
FIG. 3 depicts a schematic, top view of a catalyst unit configured to be used in an anode or a cathode of a fuel cell.

FIG. 3 depicts a schematic, top view of catalyst unit 70 configured to be used in anode 14 and/or cathode 16 of fuel cell 10. Catalyst unit 70 includes first and second graphene-based material layers 72 and 74 and catalyst material layer 76. Catalyst material layer 76 is situated between first and second graphene-based material layers 72 and 74. First graphene-based material layer 72 includes regularly repeating graphene-based materials, such as regions 78 and 80. Shaded regions, such as regions 82 and 84, depict the formation of defects based on oxygen functionalized groups (e.g., —O—, =O, —COOH, and —OH). Regions not including regularly repeating graphene-based materials or graphene-based defects based on oxygen functionalized groups are void spaces, such as void spaces 86 and 88. The void spaces may be vacancies and/or graphene holes.

As shown in FIG. 3, catalyst unit 70 has width 90, length 92 and thickness 94. Each of width 90, length 92 and thickness 94 may independently vary based on the specification of the PEMFC (e.g., stack size, power requirement, operating scheme, etc.). Width 90 may be any of the following values or in a range of any two of the following values: 10 nm, 100 nm, 1 µm, 10 µm, and 100 µm. Length 92 may be any of the following values or in a range of any two of the following values: 10 nm, 100 nm, 1 µm, 10 µm, and 100 µm. Thickness 94 may be any of the following values or in a range of any two of the following values: 1, 2, 3, 4, 5, 6, 7, 8, 9, 10, and 20 nm.

A catalyst material layer (e.g., catalyst material layer 76) may include a Pt catalyst material (e.g., Pt and Pt-M, where M equals Co, Ni, Fe, or a combination thereof). The catalyst material layer may also include other fuel cell catalyst materials, such as and without limitation, Pd, Ru, Rh, Ag, Au, Cu, Fe, Mn, Ni, Co, W, Mo, Sn, Ti, and alloys thereof (e.g., Pt—Co, Pt—Ni, Pt—Fe). The catalyst material layer may be wrapped with a graphene-based material layer or form a graphene-based composite structure with the graphene-based material layer. The graphene-based composite structures may also include one or more ternary alloy catalysts such as $Pt_xCo_yM_z$, where $0.40 \leq x \leq 0.90$, $0.05 \leq y \leq 0.25$, $0.05 \leq z \leq 0.35$, and M is a metal element other than Pt and Co, and other ternary alloy catalysts disclosed in PCT/US2020/061213, filed Nov. 19, 2020, and published as WO2022108586A1, which is incorporated by reference in its entirety herein.

First and second graphene-based material layers 72 and 74 may have a desired concentration of defects per volume of graphene-based material layer during an initial forming step by selecting one or more formation characteristics (e.g., synthesis route, precursor, and/or initial defect level in the graphene used in the initial forming step). In one or more embodiments, the initially formed graphene-based material layer may be further subjected to an activation step (e.g., electrochemical and/or chemical activation) to increase the defect concentration to a desired level of transport channels for $H_2$, $O_2$, and $H_2O$. In one or more embodiments, the activation step is separate and independent from the formation step. In other words, the activation step is performed after the formation step has concluded. The activation step may be performed after a graphene-based material layer is formed onto the catalyst layer. In another embodiment, the activation step may be performed before the graphene-based material layer is applied to the catalyst layer. The activation step increasing the defect concentration may have desired benefits such as elective ion diffusions.

In one or more embodiments, one or both of the formation and activation steps may implement a graphene coverage characteristic. Non-limiting examples of graphene coverage characteristics include flake size, graphene sheet thickness, defects, and functional groups. For example, a relatively large flake size of graphene sheet may not adhere to catalyst materials as well as a relatively small flake size of graphene.

The relatively large flake size may be any of the following values or in a range of any two of the following values: 1, 1.5, 2, 2.5, 3, 3.5, 4, 4.5, and 5 microns. The relatively small flake size may be any of the following values or in a range of any two of the following values: 100, 150, 200, 250, 300, 350, 400, 450, 500, 550, 600, 650, 700, 750, 800, 850, 900, and 950 nanometers. A relatively small flake size graphene may wrinkle and wrap around a catalyst material more easily.

In one or more embodiments, a conformal graphene coating made from a graphene-based material layer is not desired, as it may block the reactant and/or product ion (e.g., $H_2$, $O_2$, and $H_2O$) diffusions. Graphene defects (e.g., edges) may adsorb more strongly to catalyst materials because of atomic undercoordination and greater reactivity than the bulk material. If a graphene sheet is relatively thicker, it may not adsorb to the substrate catalyst materials strongly. In one or more embodiments, a relatively thinner graphene sheet of 1 to 6 monolayers is utilized.

In one or more embodiments, a certain functional group (e.g., oxygen functional group, p- or n-type doping, N-doping, and/or B-doping) may yield stronger adhesion between the graphene-based material layer and the catalyst material layer. Depending on the size and power requirement of PEM fuel cell stack, a desired level of graphene coverage on catalyst materials may be desired. Other than using intrinsic material property, a processing step (e.g., a solid-state ball-milling process step) may induce desired mixing between carbon-based materials and catalyst. In another embodiment, a solution-type process may be followed by sonication and/or chemical or physical deposition processes to obtain desired coverage, size, and shape of graphene coatings. Different carbon-type, such as including some amorphous $sp^3$-type carbon may also influence the final structure.

Figure 4:
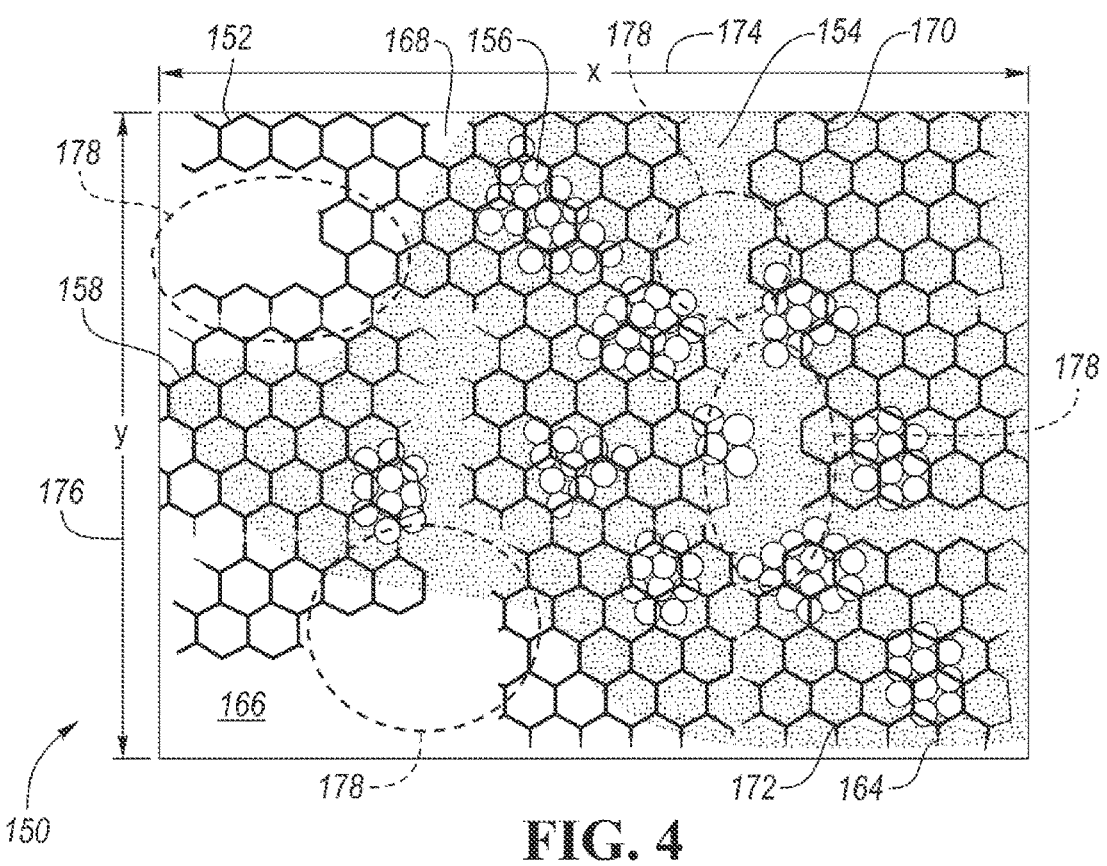
FIG. 4 depicts a schematic, top perspective view of a catalyst unit configured to be used in an anode and/or cathode of a fuel cell.
Figure 5A:
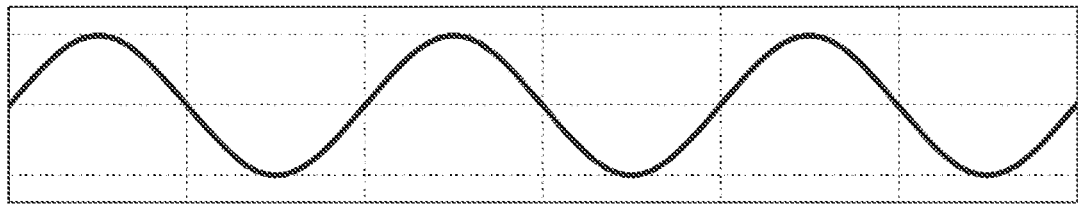
FIGS. 5A through 5D depict sine, square, triangle, and sawtooth shapes of an activation cycle for electrochemically activating a carbon-based material layer.
Figure 5B:
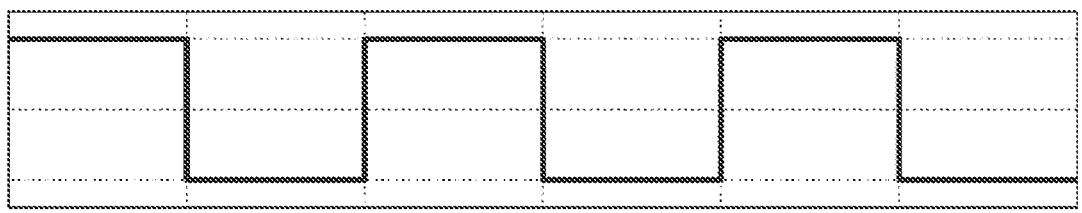
Figure 5C:
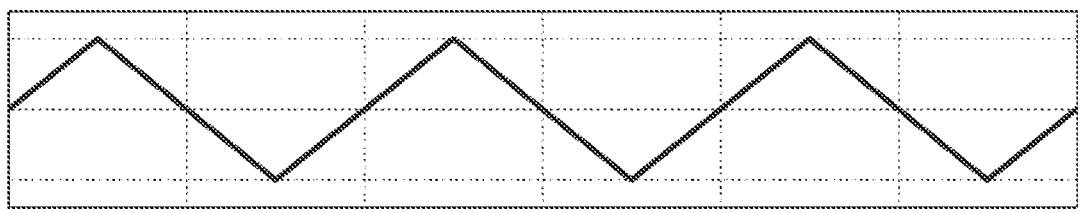
Figure 5D:
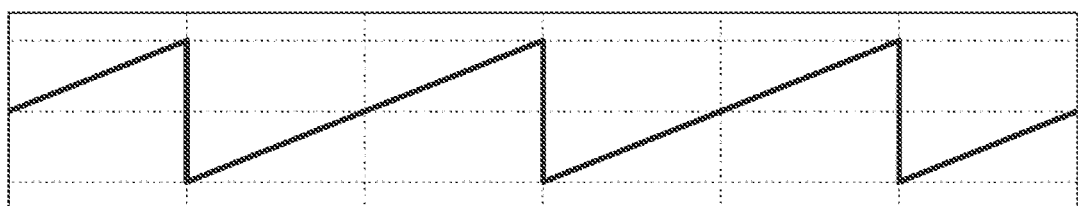

FIG. 4 depicts a schematic, top perspective view of catalyst unit 150 configured to be used in anode 14 and/or cathode 16 of fuel cell 10. Catalyst unit 150 includes graphene-based material layer 152 and catalyst support material layer 154. Catalyst material layer 156 is situated between graphene-based material layer 152 and catalyst support material layer 154. Graphene-based material layer 152 includes regularly repeating graphene-based materials, such as regions 158. Shaded regions, such as regions 164, depict the formation of graphene-based defects based on oxygen functionalized groups (e.g., —O—, =O, —COOH, and —OH). Regions not including regurly repeating graphene-based materials or graphene-based defects based on oxygen functionalized groups are void spaces, such as void spaces 166 and 168. The void spaces may be vacancies and/or graphene holes. The certain percentage may be any of the following values or in a range of any two of the following values: 5%, 10%, 15%, 20%, and 25%.

Catalyst support material layer 154 may be formed of an amorphous carbon material (e.g., $sp^3$-type carbon), one or more metal oxides (e.g., $MO_x$, where M=Ti, Sn, W, Mo, Ge, Ta, etc.), or combinations thereof. Catalyst support material layer 154 may be closer to PEM 12 than graphene-based material layer 152. In another embodiment, catalyst support material layer 154 may be sandwiched between first and second graphene-based material layers and the outer surface of the graphene-based material is contacted by a catalyst support material layer 154.

As shown in FIG. 4, catalyst material layer includes void spaces, such as void spaces 170 and 172. In one or more embodiments, one or more of the void spaces provide a diffusion path (e.g., channel) for fuel cell reactants (e.g., $H_2$, $O_2$, and/or $H_2O$). The void spaces may also shape the interface between catalyst material layer 106 and first and second graphene-based material layers 152 and 154 with decreased interfacial resistance. Due to the void spaces, the first and second graphene-based material layers 152 and 154 may wrinkle (e.g., changing the shape of the graphene-based material layers in a region above or below a void space) after a certain number of fuel cell operations. The number of operations may be any of the following values or in a range of any two of the following values: 2,000, 2,500, 3,000, 3,500, and 4,000. In one embodiment, one or more of the void spaces may be filled with one or more conducting agents other than the catalyst material. The other conducting agents may include amorphous carbon black and/or conductive polymers.

As shown in FIG. 4, catalyst unit 150 has width 174 and length 176, and a thickness (not shown). Each of width 174, length 176 and thickness may independently vary based on the specification of the PEMFC (e.g., stack size, power requirement, operating scheme, etc.). Width 174 may be any of the following values or in a range of any two of the following values: 10 nm, 100 nm, 1 μm, 10 μm, and 100 μm. Length 176 may be any of the following values or in a range of any two of the following values: 10 nm, 100 nm, 1 μm, 10 μm, and 100 μm. Thickness may be any of the following values or in a range of any two of the following values: 1, 2, 3, 4, 5, 6, 7, 8, 9, 10, and 20 nm.

FIG. 4 also depicts activation regions 178 produced by an activation step after graphene-based material layer 152 is formed. In one or more embodiments, the activation step may be performed by an electrochemical method. For example, catalyst unit 150 (e.g., an electrode) may be cycled between 0 to 1.5 V, 0.01 to 1.4 V, 0.01 to 1.3 V, or 0.02 to 1.2 V. The lower potential limit is 0 V vs. SHE; and the upper potential limit can vary from 0.8 to 1.5 V vs. SHE. The shape of activation cycle may be different, as shown in FIGS. 5A through 5D, but not limited to the sine, square, triangle, and sawtooth shapes, respectively. In one or more embodiments, a combination of two or more of the activation cycles may be utilized in the activation step. In one or more embodiments, the number of cycles may be selected depending on coating characteristic (e.g., coating loading on the catalyst materials, lower or upper potential limits, and/or shape of each activation cycle). In one embodiment, greater than 1 electrochemical activation cycle is utilized. In another embodiment, greater than or equal to 10 electrochemical activation cycles are utilized. In other embodiments, the number of activation cycles is any of the following values or in a range of any two of the following values: 25, 50, 75, 100, 150, 200, 250, 300, 350, 400, 450, and 500. The number of cycles may be higher within this range in response to the graphene-based material layer not containing a desired concentration of defects. The cycle time per cycle may be any of the following values or in a range of any two of the following values: 0.1, 0.2, 0.3, 0.4, 0.5, 1, 2, 3, 4, 5, 6, 7, 8, 9, 10, 15, 20, 25, 30, 35, 40, 45, 50, 55, and 60 seconds. In one embodiment, a longer activation hold (e.g., in square wave) may be utilized. The longer cycle time per cycle may be any of the following values or in a range of any two of the following values: 1 minute, 2 minutes, 3 minutes, 4 minutes, 5 minutes, 6 minutes, 7 minutes, 8 minutes, 9 minutes, 10 minutes, 15 minutes, 20 minutes, 20 minutes, 25 minutes, 30 minutes, 35 minutes, 40 minutes, 45 minutes, 50 minutes, 55 minutes, and 60 minutes, 1 hour, 2 hours, 3 hours, 4 hours, 5 hours, 6 hours, 7 hours, 8 hours, 9 hours, 10 hours, 15 hours, 20 hours, and 24 hours.

In one or more embodiments, the activation step may be carried out using chemical activation. For instance, the chemical activation may form defects (e.g., reactant and/or product transport channels) by treating the carbon-based material layer with a strong base (e.g., a pH of 11, 12, 13, or 14) or a strong acid (e.g., a pH of 1, 2, 3, or 4). In one or more embodiments, the treatment may include the application of one or more organic solvents (e.g., alcohol, ether, etc.). Residual organic solvent may be removed via use of a mild heating in an elevated temperature range of 100° F. to 140° F. If the chemical activation step is performed when the graphene-based material layer is adjacent the catalyst material layer, then ultrasonication may be used to mitigate aggregation of the graphene-based material layer is adjacent the catalyst material layer.

Figure 6A:
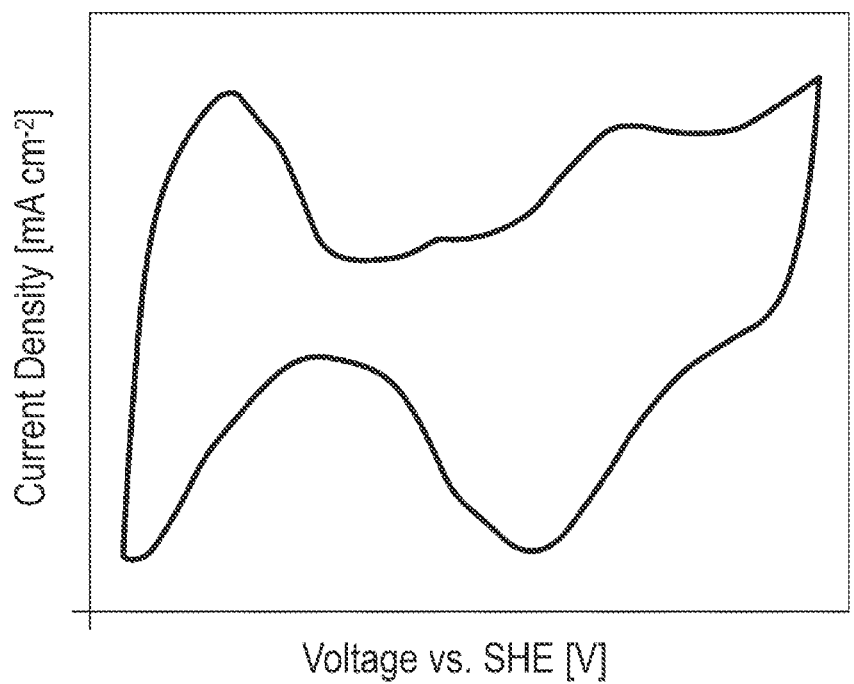
FIG. 6A shows a graph of current density [mAcm$^{-2}$] as a function of voltage versus standard hydrogen electrode (SHE) [V] for a carbon-coated catalyst material before the activation step.
Figure 6B:
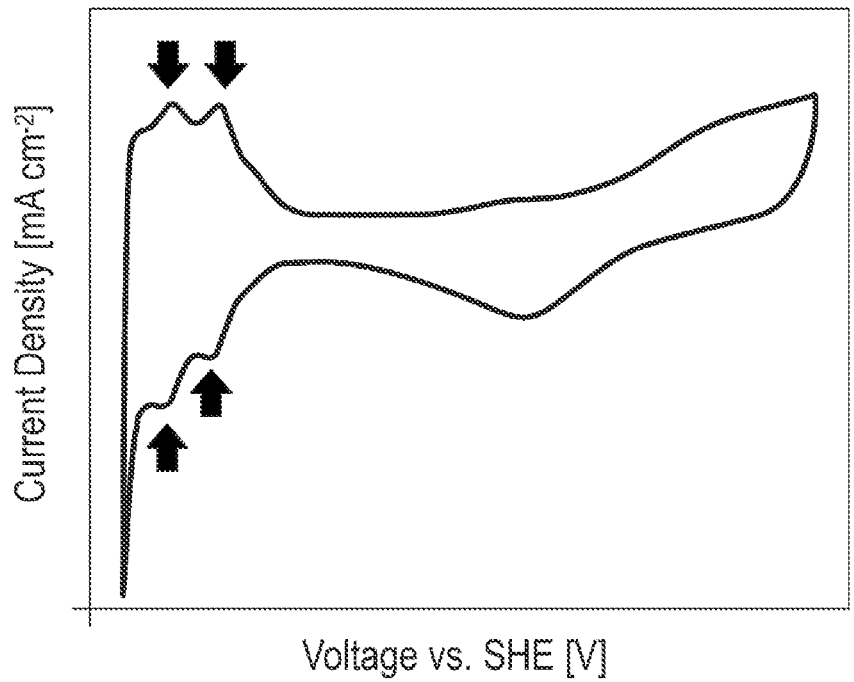
FIG. 6B shows graph of current density [mAcm$^{-2}$] as a function of voltage versus SHE [V] for the carbon-coated catalyst material after the activation step.

In one or more embodiments, the activation step using activation cycling is monitored to determine when enough secondary defects have been formed. In one or more embodiments, a cyclic voltammetry analysis may be used to determine whether the catalyst material layer is fully activated. FIG. 6A shows a graph of current density [$mAcm^{-2}$] as a function of voltage versus SHE [V] for a carbon-coated catalyst material before the activation step. FIG. 6B shows a graph of current density [$mAcm^{-2}$] as a function of voltage versus SHE [V] for the carbon-coated catalyst material after the activation step. The peaks signified by the arrows in FIG. 6B indicate typically correspond to (110) Pt surface facet, which is one of the under-coordinate catalytic surfaces for Pt. A cyclic voltammetry analysis for a pure Pt obtains a similar trend as shown in FIG. 6B. However, FIG. 6A does not display such sharp peaks at the lower potentials. In one or more embodiments, under-coordinate sites may be more reactive, which can lead to a stable interface formation. For instance, a prepared carbon-coated catalyst material as shown in FIG. 6A may be activated between 0.02 to 1.2 V versus SHE for 50 cycles. After the completion of the activation cycles, the cyclic voltammetry curves may change its shape, as shown in FIG. 6A, to signal the completion of the activation cycles.

The following application and patent are related to the present application: U.S. patent application Ser. No. 16/694,305 filed on Nov. 25, 2019 and issued as U.S. Pat. No. 11,670,790 on Jun. 6, 2023 and U.S. patent application Ser. No. 16/544,511 filed on Aug. 19, 2019 and issued as U.S. Pat. No. 11,145,875 on Oct. 12, 2021. Both of these are incorporated by reference in their entirety herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell electrode catalyst protective layer forming method comprising:
   forming primary vacancy defects in a carbon-based protective layer material via a formation step, the formation step includes a synthetic formation step, an annealing step, an ion bombardment step, or a carbon removal step, the primary vacancy defects configured to transport fuel cell products and/or reactants representing a transported portion of a total fuel cell products and/or reactants, and a difference between the total fuel cell products and/or reactants and the transported portion is an untransported portion; and
   activating secondary vacancy defects in the carbon-based protective layer material via an activation step, the secondary vacancy defects configured to transport a portion of the untransported portion of the total fuel cell reactants and/or products, and the activation step is different than the formation step.

2. The fuel cell electrode catalyst protective layer forming method of claim 1, wherein the activation step is performed after the forming step.

3. The fuel cell electrode catalyst protective layer forming method of claim 1, wherein the activation step includes electrochemical and/or chemical activation.

4. The fuel cell electrode catalyst protective layer forming method of claim 1, wherein the activation step includes electrochemical activation.

5. The fuel cell electrode catalyst protective layer forming method of claim 4, wherein the electrochemical activation includes cycling the carbon-based protective layer material between at least two voltages using a number of activation cycles having an activation shape.

6. The fuel cell electrode catalyst protective layer forming method of claim 5, wherein the activation shape is selected from the group comprising sine, square, triangle, sawtooth, and a combination thereof.

7. The fuel cell electrode catalyst protective layer forming method of claim 5, wherein the number of activation cycles is in a range of 1 to 500.

8. The fuel cell electrode catalyst protective layer forming method of claim 1, wherein the activation step includes chemical activation.

9. The fuel cell electrode catalyst protective layer forming method of claim 8, wherein the chemical activation includes applying a strong base having a base pH in a base range of 11 to 14 or a strong acid having an acid pH in an acid range of 1 to 4 to the carbon-based protective layer material.

10. The fuel cell electrode catalyst protective layer forming method of claim 1, wherein the carbon-based protective layer material is a graphene-based protective layer material.

11. A fuel cell electrode catalyst protective layer forming method comprising:
forming primary vacancy defects in a carbon-based protective layer material via a formation step, the formation step includes a synthetic formation step, an annealing step, an ion bombardment step, or a carbon removal step, the primary vacancy defects configured to transport fuel cell products and/or reactants representing a transported portion of a total fuel cell products and/or reactants, and a difference between the total fuel cell products and/or reactants and the transported portion is an untransported portion;
activating secondary vacancy defects in the carbon-based protective layer material via an activation step, the secondary vacancy defects configured to transport a portion of the untransported portion of the total fuel cell reactants and/or products, the activation step being different than the formation step; and
applying the carbon-based protective layer material to a catalyst layer material.

12. The fuel cell electrode catalyst protective layer forming method of claim 11, wherein the applying step is performed after the formation and activation steps.

13. The fuel cell electrode catalyst protective layer forming method of claim 11, wherein the applying step is performed after the formation step and before the activation step.

14. The fuel cell electrode catalyst protective layer forming method of claim 11, wherein the activation step is performed until a cyclic voltammetry analysis indicates an activation of the carbon-based protective layer material is completed.

15. The fuel cell electrode catalyst protective layer forming method of claim 11, wherein the applying step is performed before the formation and activation steps.

16. The fuel cell electrode catalyst protective layer forming method of claim 11, wherein the applying step forms a void space between the carbon-based protective layer material and the catalyst layer material, the void space configured to transport the portion of the untransported portion of the total fuel cell reactants and/or products.

17. The fuel cell electrode catalyst protective layer forming method of claim 11, wherein the applying step includes forming a carbon-based composite structure between the carbon-based protective layer material and the catalyst material layer.

18. A fuel cell electrode catalyst protective layer forming method comprising:
forming primary vacancy defects in a graphene-based protective layer material via a formation step, the formation step includes a synthetic formation step, an annealing step, an ion bombardment step, or a carbon removal step, the primary vacancy defects configured to transport fuel cell products and/or reactants representing a transported portion of a total fuel cell products and/or reactants, and a difference between the total fuel cell products and/or reactants and the transported portion is an untransported portion; and
activating secondary vacancy defects in the graphene-based protective layer material via an activation step, the secondary vacancy defects configured to transport a portion of the untransported portion of the total fuel cell reactants and/or products, the activation step is different than the formation step.

19. The fuel cell electrode catalyst protective layer forming method of claim 18, wherein the activation step implements a graphene coverage characteristic of a flake size of 100 to 950 nanometers.

20. The fuel cell electrode catalyst protective layer forming method of claim 18, wherein the activation step implements a graphene coverage characteristic of a graphene thickness of 1 to 6 monolayers.

* * * * *